United States Patent [19]
Becker

[11] Patent Number: 5,984,423
[45] Date of Patent: Nov. 16, 1999

[54] WHEEL HUB RETAINING DEVICE

[75] Inventor: William M. Becker, San Carlos, Calif.

[73] Assignee: Rockshox, Inc., San Jose, Calif.

[21] Appl. No.: 09/054,585

[22] Filed: Apr. 3, 1998

Related U.S. Application Data

[60] Provisional application No. 60/061,276, Oct. 7, 1997.

[51] Int. Cl.$^6$ ........................................ B60B 27/00
[52] U.S. Cl. ..................................... 301/110.5; 301/124.2
[58] Field of Search .............................. 301/105.1, 110.5, 301/110.6, 111, 124.2; 280/279, 288

[56] References Cited

U.S. PATENT DOCUMENTS

| | | | |
|---|---|---|---|
| 5,383,716 | 1/1995 | Stewart et al. | 301/110.5 X |
| 5,531,510 | 7/1996 | Yamane | 301/110.5 |
| 5,653,512 | 8/1997 | Phillips | 301/110.5 X |

*Primary Examiner*—Russell D. Stormer
*Attorney, Agent, or Firm*—Skadden, Arps, Slate, Meagher & Flom; David W. Hansen

[57] ABSTRACT

A hub retainer device for maintaining the position of a bicycle wheel, particularly the wheel hub, with respect to a bicycle fork dropout. The hub retainer device includes a base portion dimensioned to fit securely within a recess defined in an outer surface of a bicycle fork dropout. The bicycle wheel skewer rod is passed through a hole defined in the base portion of the hub retainer device. The hub retainer further includes a projecting portion shaped to fit securely within the dropout slot. Preferably, a shoulder portion extends from the projecting portion beyond the inside surface of the dropout and is shaped to receive a shoulder on the wheel hub or an axle stub. Thus, loads on the wheel are transferred to the interface between the hub and hub retainer rather than to the interface between the skewer rod and the dropout as in prior art configurations not having a hub retainer as described.

17 Claims, 3 Drawing Sheets

WHEEL HUB RETAINING DEVICE

CROSS-REFERENCE TO RELATED APPLICATION

The present application claims the benefit of the earlier filing date of pending U.S. Provisional Pat. App. Ser. No. 60/061,276, filed Oct. 7, 1997.

BACKGROUND OF THE INVENTION

The present invention relates to a device that secures the connection between a wheel and a bicycle fork dropout.

A typical bicycle frame has at least one bicycle fork for mounting a wheel to the bicycle. A typical fork has a pair of spaced apart fork legs (or at least one fork leg), each leg having a dropout at a first end. The dropouts have inner sides (facing each other), outer sides opposite the inner sides, and an elongated aperture formed therein to form a slot for receiving a wheel axle or skewer rod. The hub of the bicycle wheel is mounted on the skewer, and a wheel may be mounted on the bicycle frame by inserting the skewer into the slot.

Skewer-type quick release devices are commonly used for attaching wheel axles to bicycle fork dropouts. They are advantageous because they secure the wheel assembly to the fork yet permit fast engagement and disengagement of the wheel assembly with respect to the fork with a quick, simple step, such as the turning and loosening of a quick release lever. The diameter of the skewer is smaller than the width of the slot in the fork dropout so that the skewer may readily slide radially into the dropout.

A problem with these skewer rods arises when braking forces are applied to the wheel, and particularly when such braking forces are applied to the wheel by a bicycle disk brake. Disk brakes have typically been used in off-road and racing applications, both downhill and cross-country. Disk brakes include a brake disk mounted on the wheel adjacent the center of the wheel and a brake pad mounted adjacent the brake disk. The brake pad engages the brake disk to slow down rotation of the bicycle wheel. Due to the large forces that arise when the disk brake is applied to slow rotation of the bicycle wheel, the skewer and quick release assembly tends to be insufficient to hold the wheel hub assembly and dropout rigidly together and in their proper position. The hub assembly thus tends to shift with respect to the dropout during braking. As all bicycle hubs are mounted in the same area of the dropout and therefore experience similar forces, such slippage is a problem in all standard applications of disk brakes on bicycles. In addition, the large forces generated during braking and the resulting relative movement between the skewer and the dropout load the skewer such that the skewer may become weakened or damaged by the dropout.

One solution to the slippage problem is to knurl both the inside face of the fork dropout and the outside mating face of the hub. The friction created by this process may be sufficient to hold the dropout and hub in place in many instances. However, such a solution requires special manufacturing, or at least modification, of both the dropout and the hub and does not provide the level of secured attachment desired for rigorous braking applications. An attachment of a bicycle wheel to a bicycle fork dropout that relies on more than just frictional forces therefore would be desirable.

SUMMARY OF THE INVENTION

It is therefore an object of the present invention to provide a low cost, simple to manufacture, and easily applicable solution to the possibility of a bicycle wheel disengaging from a bicycle fork, particularly during braking.

It is a related object of the present invention to provide an element that reduces play between a bicycle wheel skewer rod and a dropout of a bicycle fork.

It is a further object of the present invention to provide an element that reduces or redistributes the load imparted to a bicycle wheel skewer rod during braking.

These and other objects, features, and advantages of the present invention are accomplished in accordance with the principles of the present invention by providing a hub retainer device that may be inserted within the slot of a bicycle fork dropout. The skewer on which a bicycle wheel is mounted is passed through a hole in the hub retainer. The hub retainer bears against a recess in the dropout to maintain a sturdy connection of the wheel and dropout.

The above and other objects, features, and advantages of the present invention will be readily apparent from the following detailed description of the invention taken in conjunction with the accompanying drawings wherein like reference characters represent like elements, the scope of the invention being set out in the appended claims.

DETAILED DESCRIPTION OF THE INVENTION

Figure 1:
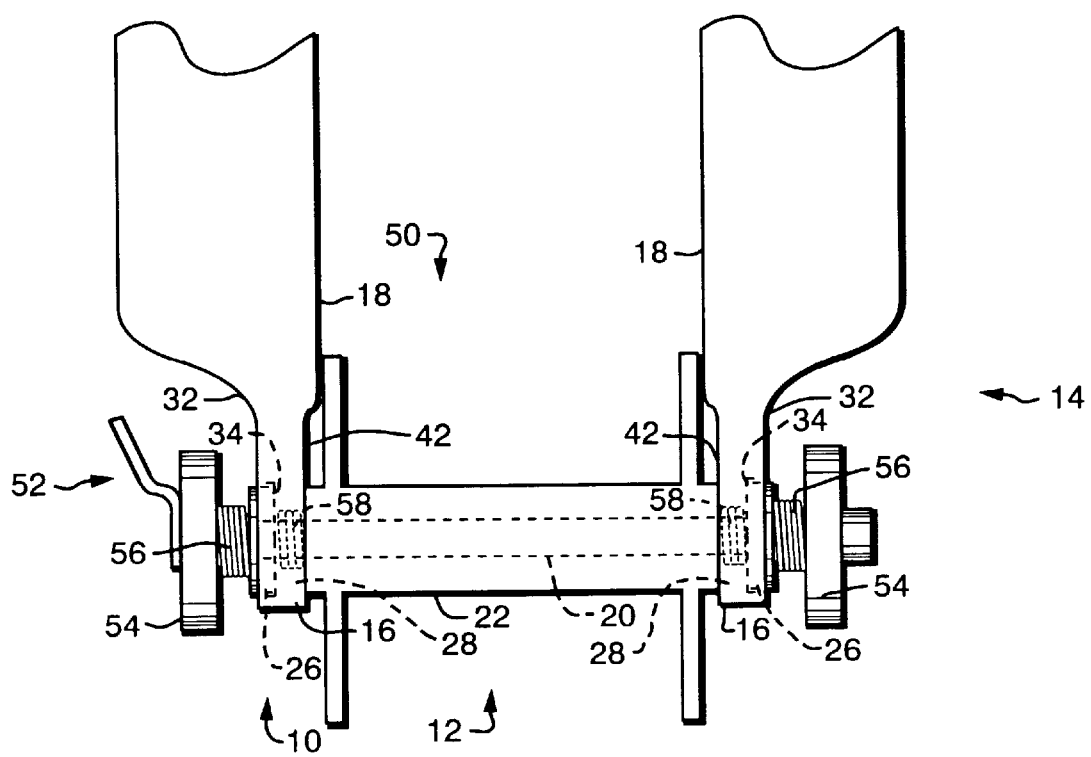
FIG. 1 is a front elevational view of the central portion of a wheel assembly mounted on the dropouts of a bicycle fork with the use of one embodiment of a hub retainer formed in accordance with the principles of the present invention.

In accordance with the principles of the present invention, a hub retainer device 10 is provided to more securely couple a bicycle wheel assembly 12 to a bicycle fork assembly 14, particularly the dropout portions 16 of the fork legs 18, as shown in FIG. 1. A bicycle wheel (only wheel hub 22 being shown) is mounted on a skewer rod 20. Skewer rod 20 is inserted through a skewer hole 23 in a base portion 24 of hub retainer 26. The diameter of skewer hole 24 of hub retainer 26 is sized so that any typical skewer rod 20 may be inserted therein.

Figure 3:
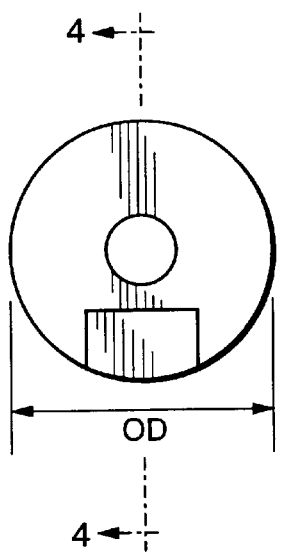
FIG. 3 is a front elevational view of the hub retainer of FIG. 2.
Figure 4:
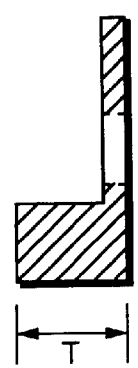
FIG. 4 is a cross-sectional view, along line IV—IV, of the hub-retainer of FIG. 3.
Figure 5:
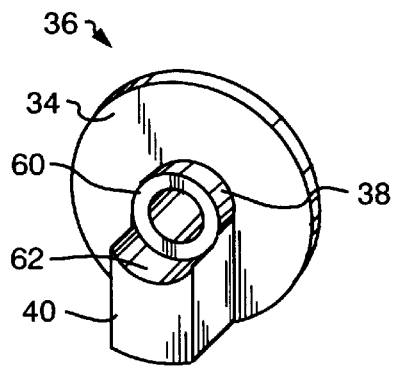
FIG. 5 is a perspective view of an additional embodiment of a hub retainer formed in accordance with the principles of the present invention.
Figure 6:
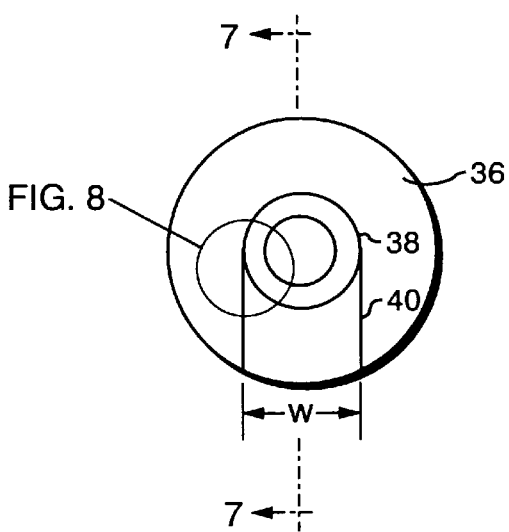
FIG. 6 is a front elevational view of the hub retainer of FIG. 5.
Figure 7:
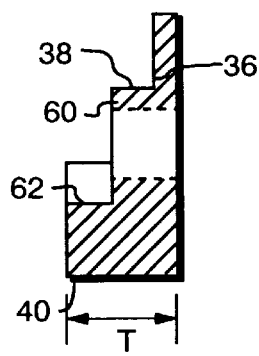
FIG. 7 is a cross-sectional view along line VII—VII, of the hub retainer of FIG. 6.
Figure 8:
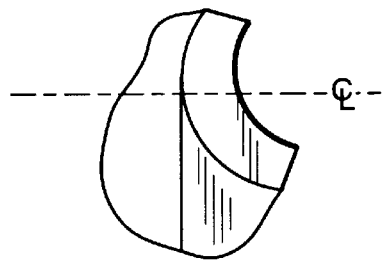
FIG. 8 is a detail of FIG. 6.

A projecting portion 28 of hub retainer 26 is inserted through slot 30 of a bicycle fork dropout 16 to thereby mount the bicycle wheel thereto. Outer sides 32 of fork dropouts 16 each have an annular recess 34 defined therein, circumferentially disposed about the center of dropout slot 30. The outer diameter OD (FIG. 3) of hub retainer 26 is configured for close engagement within annular recess 34 formed in fork dropout 16. After dropout 16 and recess 34 are painted, outer diameter OD of hub retainer 26 fits snugly within annular recess 34 of dropout 16 to hold hub retainer 26 in place with respect to dropout 16. Due to the mating configuration of hub retainer 26 of the present invention and slot 30 in dropout 16, the wheel connection to dropout 16 will remain rigid upon application of high braking forces to the wheel.

In another embodiment of the present invention, the above-described wheel connection is accomplished with a hub retainer 36 having a base portion 34 from which a projecting portion 38, and a hub retainer shoulder 40, extend as shown in FIGS. 4–7. Projecting portion 38 is shaped for insertion into dropout slot 30. Hub retainer shoulder 40 extending from projecting portion 38 and is dimensioned to project through dropout slot 30 and extend beyond the inner side 42 of dropout 16. Hub retainer shoulder 40 is preferably biased in a position below a shoulder formed on wheel hub 22 or an axle stub adjacent dropout 16. In the event that the skewer rod 20 shifts within dropout 16 upon application of the brake to the wheel, hub retainer shoulder 40 is loaded by the hub shoulder or axle stub, thus preventing loading of the skewer rod 20 against slot 30 in dropout 16, which could result in damage to the skewer rod 20 under severe loading conditions. Alternatively, the braking force imparted to the skewer rod may be redistributed through hub retainer shoulder 40 to dropout 16 so as to reduce the effect upon the skewer rod.

Figure 2:
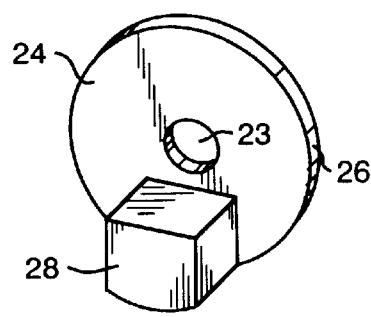
FIG. 2 is a perspective view of a hub retainer formed in accordance with the principles of the present invention.

A preferred embodiment of this arrangement is to use two of the hub retainers (either hub retainer 26 of FIGS. 2–4 in hub retainer 36 of FIGS. 5–8) described above, placing one on either side of a skewer rod assembly 50 including skewer rod 20 and wheel hub 22, as shown in FIG. 1. A quick release mechanism 52, such as those known in the art, may be used to couple the skewer rod assembly 50, including a set of hub retainers 26 or 36, to fork assembly 14. Preferably, the quick release mechanism 52 includes a pair of mounting disks 54 and biasing elements 56, such as a coil or other type of spring, that bias the hub retainers against the outer side 32 of dropout 16.

In addition, a biasing element 58 such as a coil or other type spring may be added to bias the hub retainers away from wheel hub 22 so that when the quick release levers are turned and loosened, the hub retainers are dislodged from their positions against dropout 16 and wheel assembly 12 may be more easily removed from fork assembly 14. Such a biasing element 58 may be positioned against inside face 60 of projecting portion 38 of hub retainer 36, over and resting on the outermost, hub-contacting surface 62 of hub retainer shoulder 40.

Hub retainers 26, 36 are preferably formed from a lightweight material such as aluminum. Additionally, hub retainers 26, 36 preferably are dimensioned to fit securely within dropout slots 30 and also to receive a skewer rod 20 passed therethrough. Current standard dimensions in the industry are a 100 mm width between fork dropouts and 9 mm diameter axle stubs, for all cross-country and lower-end downhill bikes (higher end models have a through-axle dropout design). Thus, the thickness of base portion 24, 34 is preferably between about 0.065 in. (0.165 cm.) to about 0.09 in. (0.229 cm.), while the entire thickness T of hub retainer 26, 36 is preferably between about 0.335 in. (0.851 cm.) to about 0.35 in. (0.889 cm.). The width W of projection portion 28, 38 is preferably approximately 0.347±0.003 in. (0.881±0.008 cm.).

The principles of the present invention are particularly useful when applied to the front fork of a bicycle, on which disk brakes are commonly mounted. However, it will be appreciated that rear fork and wheel connections may nonetheless utilize a hub retainer device formed in accordance with the principles of the present invention.

While the foregoing description and drawings represent the preferred embodiments of the present invention, it will he understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. For instance, it will be understood that the terms "inner" and "outer" and "upper" and "lower" have been used for the sake of simplicity, and are not intended as terms of limitation. Variations of such arrangements incorporating the basic principles of the present invention are within the scope of the present invention. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. A hub retainer device shaped to fit against a dropout of a bicycle fork, said dropout having an outside surface in which a recess is defined, an inside surface opposite said outside surface, and a slot extending between said outside and inside surfaces and shaped to permit insertion of a bicycle wheel skewer rod therein, said hub retainer device comprising:

a base portion dimensioned to fit within said recess in said dropout outside surface and having a hole dimensioned to receive a skewer rod therethrough;

a projecting portion shaped to fit within said dropout slot; and a shoulder extending from said projecting portion beyond said dropout inside surface.

2. A hub retainer as in claim 1, wherein said shoulder is shaped to receive a portion of a wheel assembly coupled to said dropout.

3. A hub retainer as in claim 1, further comprising a biasing element positioned on said projecting portion of said hub retainer adjacent said dropout inside surface.

4. A hub retainer as in claim 1, further comprising a biasing element positioned against said base portion of said hub retainer.

5. A bicycle fork assembly comprising:

a bicycle fork having a pair of dropouts, said dropouts having a slot shaped to permit insertion of a bicycle wheel skewer rod therein, an inside surface, an outside surface opposite said inside surface and having a recess defined therein about said slot; and a hub retainer having a base portion dimensioned and shaped to fit within said recess of said dropout and a projecting portion shaped to fit within said dropout slot, said projecting portion being dimensioned to extend beyond said inside surface of said dropout.

6. A hub retainer as in claim 5, further comprising a biasing element positioned on said projecting portion of said hub retainer adjacent said inside surface of said dropout.

7. A hub retainer as in claim 5, further comprising a biasing element positioned against said base portion of said hub retainer adjacent said outside surface of said dropout.

8. A bicycle fork assembly comprising:

a bicycle fork having a pair of dropouts, said dropouts having a slot shaped to permit insertion of a bicycle wheel skewer rod therein, an inside surface, an outside surface opposite said inside surface and having a recess defined therein about said slot; and a hub retainer having a base portion dimensioned and shaped to fit within said recess of said dropout and a projecting portion shaped to fit within said dropout slot, said hub retainer further comprising a shoulder extending from said projecting portion beyond said inside surface of said dropout.

9. A hub retainer as in claim 8, wherein said shoulder is shaped to receive a portion of a wheel assembly coupled to said dropout.

10. A bicycle wheel assembly for coupling to a bicycle dropout having an insertion slot, said wheel assembly comprising:

a skewer rod having first and second ends;

a bicycle wheel mounted on said skewer rod and having a centrally positioned hub;

at least one hub retainer having a base portion and a projecting portion shaped to fit within said insertion slot of said dropout; and a biasing element positioned against said base portion of said hub retainer and facing away from said bicycle wheel;

wherein at least one of said ends of said skewer rod is passed through a hole defined in said at least one hub retainer to thereby mount said hub retainer on said skewer rod.

11. A bicycle wheel assembly as in claim 10, wherein said at least one hub retainer includes a first hub retainer mounted on said first end of said skewer rod and a second hub retainer mounted on said second end of said skewer rod.

12. A bicycle wheel and fork assembly comprising:

a bicycle fork having a pair of dropouts, said dropouts having a slot shaped to permit insertion of a bicycle wheel skewer rod therein, an inside surface, an outside surface opposite said inside surface and having a recess defined therein about said slot;

a skewer rod having a first end and a second end;

a bicycle wheel assembly mounted on said skewer rod;

at least one hub retainer having a base portion dimensioned to securely fit within said recess of said dropouts and having a hole defined therethrough in which said skewer is mounted, and a projecting portion extending from said base portion and being dimensioned to fit within said dropout slot; and a hub retainer shoulder extending from said projecting portion beyond said inside surface of said dropout.

13. A bicycle wheel and fork assembly as in claim 12, wherein said hub retainer shoulder is shaped to receive a portion of said wheel assembly.

14. A bicycle wheel and fork assembly as in claim 13, wherein:

said wheel assembly includes a centrally positioned hub having a hub shoulder; and said hub shoulder is shaped to receive said hub retainer shoulder.

15. A bicycle wheel and fork assembly as in claim 12, further comprising a biasing element positioned between said wheel assembly and said projecting portion of said hub retainer adjacent said inside surface of said dropout.

16. A bicycle wheel and fork assembly as in claim 12, further comprising a biasing element positioned against said base portion of said hub retainer adjacent said outside surface of said dropout.

17. A bicycle wheel and fork assembly as in claim 12, wherein said at least one hub retainer includes a first hub retainer mounted on said first end of said skewer rod and a second hub retainer mounted on said second end of said skewer rod.

* * * * *